US012591125B2

(12) United States Patent
Amthor et al.

(10) Patent No.: US 12,591,125 B2
(45) Date of Patent: Mar. 31, 2026

(54) MICROSCOPY SYSTEM AND METHOD FOR CHECKING A ROTATIONAL POSITION OF A MICROSCOPE CAMERA

(71) Applicant: Carl Zeiss Microscopy GmbH, Jena (DE)

(72) Inventors: Manuel Amthor, Jena (DE); Daniel Haase, Zoellnitz (DE); Thomas Ohrt, Golmsdorf (DE)

(73) Assignee: Carl Zeiss Microscopy GmbH, Jena (DE)

( * ) Notice: Subject to any disclaimer, the term of this patent is extended or adjusted under 35 U.S.C. 154(b) by 161 days.

(21) Appl. No.: 17/578,747

(22) Filed: Jan. 19, 2022

(65) Prior Publication Data

US 2022/0236551 A1    Jul. 28, 2022

(30) Foreign Application Priority Data

Jan. 22, 2021    (DE) ..................... 10 2021 101 439.5

(51) Int. Cl.
*G02B 21/36* (2006.01)
*G06T 7/73* (2017.01)
(52) U.S. Cl.
CPC .............. *G02B 21/361* (2013.01); *G06T 7/73* (2017.01); *G06T 2207/10056* (2013.01)
(58) Field of Classification Search
CPC .................... G02B 21/361; G06T 7/73; G06T 2207/10056
See application file for complete search history.

(56) References Cited

U.S. PATENT DOCUMENTS 6,327,381 B1 * 12/2001 Rogina ................ H04N 13/167
348/E13.071
10,048,477 B1 * 8/2018 Putman ................ G06V 20/693
10,430,955 B2 10/2019 Frise et al.
(Continued)

FOREIGN PATENT DOCUMENTS

DE 29508062 U1 9/1995
DE 102017115963 A1 1/2019
(Continued)

OTHER PUBLICATIONS

Machine Translation of DE 102018110795 (Year: 2019).*
Search Report for DE 10 2021 101 439.5, Aug. 2, 2021, 6 pages (no English translation available).

*Primary Examiner* — Dave Czekaj
*Assistant Examiner* — Shanika M Brumfield
(74) *Attorney, Agent, or Firm* — LaBatt, LLC

(57) ABSTRACT

In a method for checking the rotation of a microscope camera, an overview image is captured with an overview camera of a microscope, wherein a rotational orientation of the overview camera relative to a sample stage of the microscope is known. In addition, a microscope image is captured with a microscope camera of the microscope. A rotational orientation of the microscope camera relative to the sample stage is calculated based on a relative rotation between the microscope image and the overview image, wherein the relative rotation is established by means of image structures in the microscope image and the overview image and using the known rotational orientation of the overview camera relative to the sample stage.

20 Claims, 7 Drawing Sheets

(56) References Cited

U.S. PATENT DOCUMENTS

| | | | | |
|---|---|---|---|---|
| 2008/0181486 A1* | 7/2008 | Spooner | ................... | G06T 7/55 |
| | | | | 382/154 |
| 2010/0225773 A1* | 9/2010 | Lee | ........................ | H04N 23/64 |
| | | | | 348/222.1 |
| 2014/0241617 A1* | 8/2014 | Shotton | ................ | G06F 18/214 |
| | | | | 382/159 |
| 2016/0170197 A1* | 6/2016 | Kenny | ................ | G02B 21/367 |
| | | | | 348/79 |
| 2017/0276924 A1* | 9/2017 | Chan | ..................... | G02B 21/34 |
| 2020/0371335 A1 | 11/2020 | Amthor et al. | | |
| 2021/0160434 A1 | 5/2021 | Amthor et al. | | |
| 2022/0187587 A1* | 6/2022 | Baranson | .......... | G01N 21/6428 |
| 2022/0276463 A1* | 9/2022 | Hunt | ................... | H04N 23/959 |

FOREIGN PATENT DOCUMENTS

| | | | | | |
|---|---|---|---|---|---|
| DE | 102018110795 A1 | * | 11/2019 | | |
| DE | 102019113540 A1 | | 11/2020 | | |
| DE | 102019131678 A1 | | 5/2021 | | |
| EP | 2990762 A1 | * | 3/2016 | ............ | G01C 11/02 |

* cited by examiner

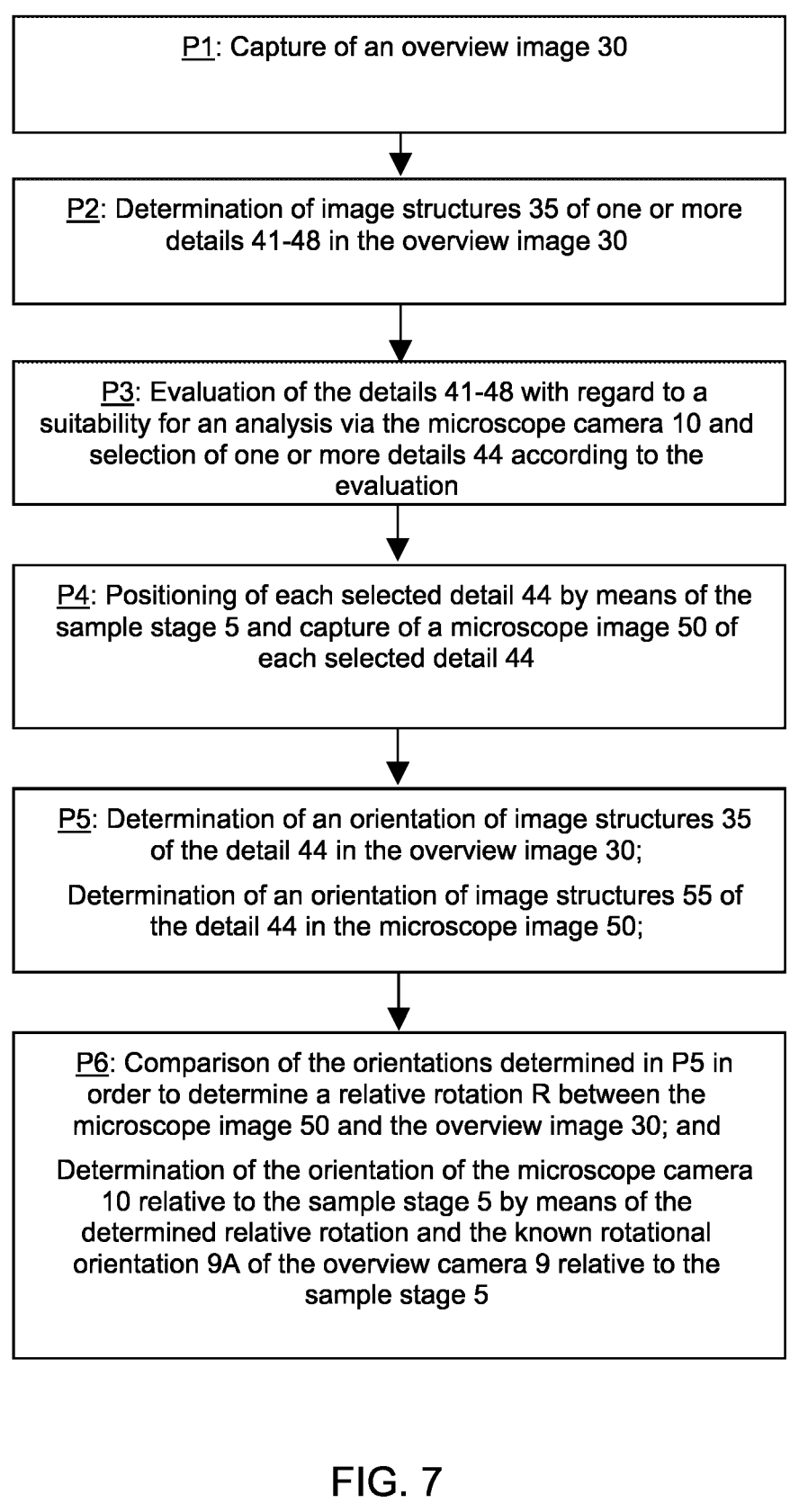

P1: Capture of an overview image 30

↓

P2: Determination of image structures 35 of one or more details 41-48 in the overview image 30

↓

P3: Evaluation of the details 41-48 with regard to a suitability for an analysis via the microscope camera 10 and selection of one or more details 44 according to the evaluation

↓

P4: Positioning of each selected detail 44 by means of the sample stage 5 and capture of a microscope image 50 of each selected detail 44

↓

P5: Determination of an orientation of image structures 35 of the detail 44 in the overview image 30;

Determination of an orientation of image structures 55 of the detail 44 in the microscope image 50;

↓

P6: Comparison of the orientations determined in P5 in order to determine a relative rotation R between the microscope image 50 and the overview image 30; and Determination of the orientation of the microscope camera 10 relative to the sample stage 5 by means of the determined relative rotation and the known rotational orientation 9A of the overview camera 9 relative to the sample stage 5

FIG. 7

MICROSCOPY SYSTEM AND METHOD FOR CHECKING A ROTATIONAL POSITION OF A MICROSCOPE CAMERA

REFERENCE TO RELATED APPLICATIONS

The current application claims the benefit of German Patent Application No. 10 2021 101 439.5, filed on 22 Jan. 2021, which is hereby incorporated by reference.

FIELD OF THE DISCLOSURE

The present disclosure relates to a microscopy system and to a method for checking a rotational position of a microscope camera.

BACKGROUND OF THE DISCLOSURE

Typical microscopy systems include, among other components, a camera (also referred to as a microscope camera in the following) and a sample stage by means of which a sample to be analyzed can be moved, in particular transversely to a viewing direction of the camera. The camera can be coupled to a microscope stand via an adapter, for example a C-mount adapter. The rotational orientation of the camera is consequently variable and thus not necessarily known. Different camera orientations can be expedient in some applications. For example, a user can select a rotational position by means of which an elongated sample extends over the image diagonal so that the entire sample is visible in a microscope image. In other situations, however, an unsuitable rotational orientation can result in drawbacks, for example when a plurality of laterally overlapping microscope images are combined into an aggregate or panoramic image. This technique, in which individual microscope images constitute tiles of the aggregate image, is also referred to as image stitching or mosaic imaging. A common issue with this technique is illustrated with reference to FIG. 1. FIG. 1 shows a plurality of microscope images 50A, 50B, 50C combined into an aggregate image 60. During or between the capture of the respective microscope images 50A-50C, the sample stage was moved laterally along a translational direction 51 so that the microscope images 50A-50C show sample areas that overlap each other in the translational direction 51. An image edge 56 of the microscope images 50A-50C, however, does not run parallel to the translational direction 51 but at an angle 57 with respect to the translational direction 51. As a result of the angle 57, the aggregate image 60 contains blank image areas 62 that are not filled by one of the microscope images 50A-50C. The aggregate image 60 can be cropped to remove the distracting blank image areas 62, but this results in the loss of image information of analyzed sample areas while the cropped aggregate image is potentially smaller than originally desired.

The generation of an aggregate image 60 with blank image areas 62 can be prevented when the orientation (rotational orientation) of the microscope camera relative to the sample stage is known. In this case, for example, a translational direction of the sample stage that runs parallel to an image edge of a microscope image can be selected. Alternatively, the rotational orientation of the microscope camera can be corrected so that an image edge of the microscope images runs parallel to a translational direction of the sample stage.

A known method for determining the rotational orientation of the microscope camera relative to the sample stage uses a calibration sample. The calibration sample is moved by means of the sample stage while a plurality of microscope images are captured. A direction of movement of the calibration sample can be inferred from the microscope images, whereby the rotational orientation of the microscope camera can be determined. In some cases, a sufficiently structured sample can be used instead of a calibration sample. Not all samples are suitable for this purpose, however, so that a separate measurement using a calibration sample is often necessary before the actual analysis of a sample can begin. This approach typically also requires further actions by a user, e.g., a manual positioning and focusing of a sample area or of the calibration sample.

Methods for the image stitching of microscope images have been described, for example, in U.S. Pat. No. 10,430, 955 B2 or by the Applicant in DE 10 2019 131 678.

The Applicant also disclosed, in DE 10 2019 113 540, a microscope in which an overview image of the sample carrier is captured with an additional overview camera. A location suitable for an automatic focusing is determined in the overview image.

A generic microscopy system comprises a microscope with a microscope camera for capturing at least one microscope image and with an overview camera for capturing an overview image. A rotational orientation of the overview camera relative to a sample stage of the microscope is known. The microscopy system further comprises a computing device configured to process the microscope image and the overview image.

SUMMARY OF THE DISCLOSURE

It can be considered an object of the invention to provide a microscopy system and a method which make it possible to check a rotation of a microscope camera in a manner that is particularly quick and robust.

This object is achieved by means of the method with the features of claim 1 and by means of the microscopy system with the features of claim 2.

In the method according to the invention for checking a rotation of a microscope camera, an overview image is captured with an overview camera of a microscope. A rotational orientation of the overview camera relative to a sample stage of the microscope is known. In addition, a microscope image is captured with a microscope camera. A rotational orientation of the microscope camera relative to the sample stage is calculated based on a relative rotation between the microscope image and the overview image, wherein the relative rotation is established by means of image structures in the microscope image and the overview image, and wherein the known rotational orientation of the overview camera relative to the sample stage is used.

Correspondingly, in the microscopy system of the aforementioned type according to the invention, the computing device is configured to calculate a rotational orientation of the microscope camera relative to the sample stage based on a relative rotation between the microscope image and the overview image, wherein the relative rotation is established by means of image structures in the microscope image and the overview image, and wherein the known rotational orientation of the overview camera relative to the sample stage is used.

This way, the known orientation of the overview camera relative to the sample stage or microscope stand is exploited. By determining a relationship between the respective orientations of the image content of the microscope image and of the overview image by means of image analysis, it is possible to infer the orientation of the microscope camera relative to the sample stage or microscope stand. In principle, a single overview image and a single microscope image already suffice for this purpose. Any use of the singular in the present disclosure is not intended, however, to exclude the basic possibility that further overview images and/or microscope images are captured and taken into account. The invention does not require special calibration samples. Rather, the overview image and the microscope image can be captured directly with a sample or a sample carrier holding the sample. The sample does not necessarily have to exhibit certain properties, e.g. with regard to a suitable structure or the contrast in the overview image and the microscope image, as an image analysis can occur using other image areas that do not show the sample but rather, e.g., the sample carrier or a holding frame for the sample carrier. This also reduces a light exposure of the sample. Moreover, by means of the approach according to the invention, the translation paths of the sample stage can be short so that the required time periods are low.

Optional Embodiments

Advantageous variants of the microscopy system according to the invention and of the method according to the invention are the object of the dependent claims and are explained in the following description.

In particular the following processes can be performed or commanded by the computing device: Image structures of a detail can first be localized in the overview image. This step can occur by means of image analysis. The detail can be, e.g., a cover slide corner or sample carrier corner, as will be explained in greater detail later on. By means of the localization, the image area of the detail is determined in the overview image. If the overview camera is calibrated with the stand or sample stage, a location of the detail in space, i.e. on the sample stage, can be inferred from the image coordinates of the detail in the overview image. A positioning of the location of the detail by means of the sample stage is thus possible in a next step. This is understood to mean that the sample stage is moved laterally so as to place the detail in the optical path of the microscope or in the field of view of the microscope camera. "Laterally" can be understood as a direction that is transverse or perpendicular to the viewing direction of the microscope camera. For easier understanding, various descriptions relate to a movement to a location of the detail, which shall be understood as a movement of the sample stage such that the location of the detail is moved towards an optical axis/into a field of view of the camera that is used. Optionally, the sample stage can additionally be translated in the viewing direction, which can also be called a height direction or z-direction. This can occur as a function of a height level of the selected detail. The microscope image is then captured at the positioned location so that the microscope image shows image structures of the detail. In particular the relative rotation between the microscope image and the overview image can now be determined by means of the image structures in the microscope image and in the overview image. If the detail in question is, for example, a cover slip corner, an orientation of the cover slip corner can be respectively determined in the overview image and in the microscope image. An angle of rotation between these two orientations indicates the angle by which the microscope camera is rotated relative to the overview camera. Indications concerning the orientation, rotation or rotational orientation can be understood as relating to the field of view of the cameras in the sample area or on the sample stage. The fields of view are in alignment (i.e. they have a relative rotation of 0 degrees relative to one another) when a depicted object has the same orientation in both images, for example when a depicted straight edge lies at the same angle relative to the lower edge of the image in both images.

Image Structures

The image structures that are assessed in the overview image and in the microscope image in order to determine an orientation can show the same structure (the same detail). In particular, the image structures can represent at least one detail of a sample carrier, of a holding frame for a sample carrier, of the sample stage or of an object or element present on the sample carrier. In particular straight edges or corners are suitable as details for analysis, as they permit a particularly precise determination of angles in the images. A detail can thus be, inter alia, a cover slip corner or edge, a sample carrier corner or edge, a labelling field corner or edge, or a holding frame corner or edge, in particular at a recess of the holding frame for a sample carrier. Besides outer edges, the edges of a sample carrier can also relate to the edges at sample receptacles, e.g., the edges of wells of a microtiter plate. The detail can also be a marking on a holding frame or on a sample carrier, or an adhesive label, visible damage, text or a contamination on the sample carrier or on another component in the sample area. Besides the cited cover slips, an object on the sample carrier can also be, for example, a lid on the sample carrier. Contaminations can be, e.g., fingerprints, hair, lint or gas bubbles on liquids. Visible damage can be, e.g., a chipped edge in the cover slip or in the sample carrier, or one or more scratches. In the event of the use of a plurality of scratches (or generally a plurality of adjacent elements) as a detail, it is also possible to assess, instead of the orientation of a single scratch/element, an orientation of the plurality of scratches/elements relative to one another in the overview image and the microscope image. The sample itself, in particular macroscopic structures of a sample, can also be understood as an object on the sample carrier. In principle, it is also possible to assess structures on the sample stage for the determination of the orientation. For example, holes, brackets, clips, screws or markers can be visible on the sample stage.

While the same detail in the overview image and in the microscope image can be used to determine the orientation, it is in principle also possible to analyze different details with a known orientation relative to one another. For example, the image structures that are assessed in the overview image in order to determine an orientation can represent a corner of a square cover slip. The image structures in the microscope image can show a different corner of the square cover slip. As the orientation of the corners of the square cover slip relative to one another is known, it is also possible to determine a relative rotation between the microscope image and the overview image in situations where the orientations of different cover slip corners in these images have been established.

Evaluation and Selection of Image Structures

The computing device can be configured to be able to localize at least two of the details cited above in the overview image. If the image structures of a plurality of different details are found in the overview image, the computing device selects one or more of these details. The selected detail or details are used for determining the orientation.

The selection can optionally be based on an evaluation of the image structures of these details in the overview image.

In particular, the evaluation can be carried out based on one or more of the following criteria:

Geometric shapes of the image structures can be taken into account. For example, in light of its straight lines, an edge or corner can be more suitable than handwriting or lint. Generally speaking, a shape can be evaluated as better if it has sharp edges and is not rotationally symmetrical or round.

A type of a localized detail can be determined, wherein a corresponding evaluation is stored for different types. These evaluations can indicate how well the different types are visible, not just in overview images, but also in microscope images. For example, glass edges generally provide a high image contrast in both overview images and microscope images.

A possibility of a safe positioning and focusing of the details can also be taken into account in the evaluation. If a translation path is not free for an employed objective or if safety distances of a collision prevention system would be compromised, a poorer evaluation is given.

The evaluation can also relate to a period of time required to capture a microscope image of a detail, or to a length of a sample-stage translation path (i.e. to a translation time) required to position a detail. The shorter a translation path is to a detail, the better the awarded evaluation.

If a plurality of details are selected to determine the rotational orientation of the microscope camera, then the computing device can make this selection as a function of translation paths of the sample stage between these details. For example, although two opposite corners of a sample carrier could be evaluated as particularly suitable, the translation path between these corners would be particularly long. In order to achieve results with optimal precision in a predetermined period of time, it may thus be preferable to analyze only one of the sample holder corners and, additionally, one or more details in the vicinity of this sample holder corner.

Rotational Alignment of the Overview Camera

The overview camera can be firmly mounted on a microscope stand. After an initial calibration or determination of the rotational orientation of the overview camera relative to the sample stage, this rotational orientation is thus known. The calibration of the overview camera relative to the sample stage is optional; calibration in this context is understood to mean that image coordinates of the overview image can be converted into spatial coordinates at the sample stage or into coordinates in a plane at the sample stage by means of calibration parameters. It is in principle already sufficient, however, if a direction in the overview image can be identified as a direction of the sample stage. The known rotational orientation of the overview camera can thus describe how an (essentially arbitrarily definable) direction or axis of the sample stage runs within the overview image. In particular, the known rotational orientation of the overview camera permits an indication of a direction of a movement axis of the sample stage in the overview image.

Relative Rotation

The computing device can be configured to determine a relative rotation between the microscope image and the overview image in the following manner: an orientation of a localized image structure in the overview image is determined, e.g. an orientation relative to one of the image edges. If the image structure represents an edge, then the orientation can indicate an angle between the edge and a predetermined image edge/an image border of the overview image. An orientation of an image structure in the microscope image is then determined. This image structure can represent the same detail and the determination of the orientation can occur as described for the overview image. The orientations of the image structures in the overview image and in the microscope image can then be compared with one another, for example the difference between the angles can be determined. The difference between the orientations in the overview image and in the microscope image indicates the relative rotation. The relative rotation can now be taken into account in a calculation in conjunction with the known orientation of the overview camera, for example by adding the two angles so as to determine the rotational orientation of the microscope camera relative to the sample stage.

The fact that the calculation of the rotational orientation of the microscope camera relative to the sample stage is based on a relative rotation between the microscope image and the overview image does not necessarily mean that the relative rotation is explicitly calculated and output. Rather, a rotation between image content of the microscope image and image content of the overview image is established and taken into account in essentially any manner. For example, an orientation of image structures in the overview image can be determined as an angle relative to an axis that indicates a direction or axis of movement of the sample stage in the overview image. Image content of the microscope image is then rotated by said angle. An orientation of the image structures in this rotated microscope image is now determined relative to an axis that, in the rotated microscope image, runs parallel to the aforementioned axis in the overview image; this orientation indicates the rotational orientation of the microscope camera relative to the sample stage directly.

Machine Learning Model for Determining a Rotation

It is also possible to use a machine learning model in order to calculate from input data the rotational orientation of the microscope camera or the relative rotation between the overview image and the microscope image. A machine learning model is understood to be a model that has been learned using training data. The training data can be annotated, a target result (ground truth) being specified in the process. For example, training data can comprise a pair or pairs of input images respectively consisting of an overview image (or a section thereof) and a microscope image, wherein a relative rotation between these images is additionally specified in the form of an annotation. The section of the overview image can in particular be an image section that shows the same detail as the microscope image. At least two images are thus always entered/input into the model conjointly, namely an overview image (or section thereof) and a microscope image (or section thereof). With the aforementioned training data, a model is learned which, upon completion of the training, calculates from an input overview image (or section thereof) and a simultaneously input microscope image (or section thereof) a relative rotation between said images.

The input data can also comprise more than two images, e.g. a plurality of microscope images, as described in greater detail later on.

Moreover, the input data can also comprise the known rotational orientation of the overview camera. In this case, the rotational orientation of the microscope camera can be specified directly in the training in the form of an annotation. A model is thereby learned that, based on an input overview image (or section thereof), a simultaneously input microscope image (or section thereof) and input information regarding the rotational orientation of the overview camera, directly calculates an output that indicates the rotational orientation of the microscope camera.

In other words, the computing device can be configured to feed input data to a machine learning model, wherein the input data comprises at least the overview image and the microscope image or respective sections of the same, wherein the machine learning model is trained, using training data that resembles the input data, either to calculate a relative rotation between an input overview image and an input microscope image or sections of the same or to calculate a rotational orientation of the microscope camera.

Contextual Information

Various examples of contextual information are described in the following, which can be used in principle in any or all of the performed image analysis steps. The image analysis steps can relate to, e.g., the localization of image structures in the overview image or the calculation of the rotational orientation of the microscope camera, in particular the calculation of a relative rotation between a microscope image and an overview image. The contextual information can also be exploited for any substeps comprised by the method, e.g., for determining an orientation of image structures in the overview image or microscope image. The same or different contextual information can be used for different image analysis steps. The image analysis steps can be executed by machine learning models or by classic algorithms without the use of a machine learning model.

The contextual information can relate in particular to one or more of the following:

a type of holding frame used. The type can be input manually by a user or determined by image analysis from the overview image or a further overview image. For example, the contextual information can indicate the use of a holding frame type that comprises two brackets whose opposite inner sides/edges respectively have the shape of a circle segment. This contextual information can be used to localize image structures in the overview image that show an edge of the holding frame for the subsequent method steps.

a type of sample carrier used. Possible different types are, for example, microtiter plates, chamber slides, Petri dishes or Petri dishes formed with a plurality of separate compartments. Analogously to the foregoing description regarding the type of holding frame, the type of sample carrier used can be input manually by a user or determined by image analysis from the overview image or a further overview image. Suitable details can be derived from the knowledge of the sample carrier and their image structures used for determining a rotation.

a preselection by a user of a type of detail. A user can manually select or preselect the type of detail whose image structures are to be localized in the overview image. This selection can be used as contextual information. Such a manual preselection can be expedient, for example, when the user has applied a marking to the sample carrier.

a quality of at least one previous calculation of the rotational orientation of the microscope camera. The quality can take the form of, e.g., user feedback. If contextual information indicates a low quality at which one or more previous calculations of the rotational orientation were inaccurate, this contextual information can be used to set a higher number of different image structures to be captured by respective microscope images and used for determining a rotation. For example, it can be provided in the event of a high quality that the rotational orientation is determined merely at one corner of a cover slip or sample carrier while, in the event of a low quality, the rotational orientation is to be determined using a plurality of corners of the cover slip or sample carrier.

The computing device can also be configured to take into account a known rough orientation of the microscope camera when calculating the rotational orientation of the microscope camera, in particular in the form of contextual information. Potential ambiguities can be excluded by means of a known rough orientation. If, for example, the image structures of a detail in the microscope image exhibit a rotational symmetry, the known rough orientation can help in determining which of a plurality of possible rotations is actually present. If the detail in question is a straight edge, two orientations that are rotated 180° in relation to one another may be possible, in which situation one of the two orientations can be selected as correct by means of the rough orientation.

Image Series

Optionally, it is possible during the positioning of the location of the at least one detail (i.e., during movement of the sample stage to position the location of the detail in the view of field of the camera that captures the microscope image) to capture an image series consisting of a plurality of microscope images at different sample stage positions. The plurality of microscope images and indications of a translational direction or position of the sample stage during the positioning of the location of the at least one detail can then be taken into account in the calculation of the rotational orientation of the microscope camera. This allows more information to be exploited in addition to the information already described without a significant increase in total time requirements.

Determination of the Rotational Orientation using Round Details

Determining the orientation using round details, for example circular wells of a microtiter plate, can be difficult. If, for example, a well is visible in its entirety in a microscope image, then it may not be possible to determine an orientation of the well in the microscope image or may only be possible to determine the same imprecisely due to the rotational symmetry of the well.

Round objects can be easier to assess if they are large enough. For example, only a small section of the circular rim of a Petri dish might be visible in the microscope image so that the rim section appears approximately straight or at least does not exhibit any rotational symmetry within the microscope image.

In order to render possible a determination of an orientation of the microscope camera even when using, e.g., circular wells, the computing device can be configured to capture a plurality of microscope images of a detail localized in the overview image at different sample stage positions whenever a calculation of the rotational orientation based on a single microscope image would be imprecise or is not possible. The rotational orientation of the microscope camera can then be calculated based on a translation of image structures of the detail in the plurality of microscope images and taking into account the different sample stage positions. This method of calculation is an alternative to the approach described above, which infers the orientation of the microscope camera from a comparison of the respective orientations of image structures in the overview image and in the microscope image. The computing device is configured in such a manner that it is capable of executing both alternatives. Which of the two alternatives is implemented can be selected by the computing device, for example as a function of a shape or type of the localized detail.

Actions Following from the Determined Rotational Orientation of the Microscope Camera The computing device can be configured to perform one or more different actions based on the determined rotational orientation of the microscope camera:

For example, a calibration can be performed or proposed to a user. In particular, an instruction to rotate the microscope camera can be output to a microscope user. This provides the user with an interactive assistance in order to set a rotation correctly. Further microscope images can be captured while the user rotates the microscope camera. An orientation of the depicted image structures can be respectively determined in order to monitor the rotational movement effected by the user. Instructions to the user can indicate a direction of rotation as well as a stopping of the rotational movement.

In cases where a plurality of microscope images are captured in succession at different sample stage positions and assembled into an aggregate image, it is also possible to define the sample stage positions as a function of the calculated rotational orientation of the microscope camera so that the aggregate image displays a predetermined sample area without any gaps and the aggregate image does not have any blank areas.

Optionally, a translational direction of the sample stage can be set as a function of the calculated rotational orientation of the microscope camera. In particular, the translational direction can be set so as to run parallel to an image edge of the microscope image. If a plurality of microscope images are captured in succession with this translational direction, they can be assembled into an aggregate image in which the blank image areas described in the introductory portion of the description are avoided.

The determined rotational orientation of the microscope camera can also be communicated to an image stitching algorithm, which can be part of the computing device. The image stitching algorithm is designed to stitch a plurality of microscope images captured at different sample stage positions together into an aggregate image and to take into account the determined rotational orientation of the microscope camera during said stitching. It is thereby possible to achieve a more precise stitching.

General Features

A microscopy system denotes an apparatus that comprises at least one computing device and a microscope. A microscope can be understood to be essentially any measurement device with magnification capabilities, in particular a light microscope, an X-ray microscope, an electron microscope, a macroscope or an image-capturing device with magnification capabilities of some other design.

The computing device can physically be part of the microscope, it can be arranged separately in the vicinity of the microscope or be arranged at a remote location at any distance from the microscope. The computing device can also be designed to be decentralized and to communicate with the microscope via a data link. It can generally be formed by any combination of electronics and software and comprise in particular a computer, a server, a cloud-based computing system or one or more microprocessors or graphics processors. The computing device can also be configured to control the microscope camera, the overview camera, image capture, the sample stage drive and/or other microscope components.

The sample carrier can be essentially any object for holding one or more samples, for example a slide plate with a cover slip, a microtiter plate, a chamber slide, a Petri dish or a Petri dish formed with a plurality of separate compartments. The sample carrier can comprise one or more sample receptacles for respectively holding a sample, e.g. round wells/vessels of a microtiter plate or rectangular chambers of a chamber slide. The sample can be any sample and can comprise, for example, objects held in a liquid. In particular, a sample can comprise biological cells or cell parts, material samples or rock samples or electronic components.

The overview camera for capturing an overview image is provided in addition to the microscope camera with which images of a sample area are captured with a higher magnification. The overview camera can be mounted on a stationary device frame, e.g. a microscope stand, or on a movable component, e.g. a sample stage, focus drive or objective revolver. The overview image can be a raw image as generated by an overview camera or a processed image based on one or more raw images. In particular, a captured raw image/overview image can be processed before undergoing an assessment in accordance with the present disclosure. It is also possible to provide a plurality of overview cameras that point at the sample carrier from different perspectives. An overview image can be calculated from images of the plurality of overview cameras.

Optionally, an illumination device can illuminate a sample carrier during the capture of overview images. The illumination device can be a light source of the microscope that is also employed during a sample analysis using the microscope objective and the microscope camera, e.g. a light source for incident light or transmitted light analyses. Alternatively, it can be an additional light source used solely for capturing overview images and directed, for example, at an oblique angle at a top or bottom side of a sample carrier.

A microscope image is understood to be an image captured by the microscope camera via a microscope objective. The microscope image can be a raw image or be generated by means of image processing from one or more raw images of the microscope camera. In principle any measurement principle or contrast method can be used. For example, fluorescence imaging or laser scanning imaging is also possible.

The image processing for generating the overview image and/or the microscope image from a corresponding raw image can take the form of, for example, an image segmentation that generates a segmentation mask. In a segmentation mask, different pixel values designate different objects, e.g., a sample carrier, a sample area and a background. A segmentation mask can in particular be a binary mask in which an object to be found is discriminated from the remaining image content. Segmentation masks can be advantageous for assessing the edges or corners of, e.g., the sample carrier or a cover slip. In the different described variants, the determination of an orientation of sample structures can thus optionally occur by means of segmentation masks. Additionally or alternatively, image processing can also comprise a conversion of an overview image captured at an oblique angle to another perspective. In particular, by means of calibration parameters, a raw image of the overview camera captured at an oblique angle to a sample carrier or sample stage can be transformed into a top view image by means of a homographic mapping. The determination of an orientation of an image structure can occur in the top view image or in an image calculated from the top view image, for example a segmentation mask. Alternatively, it is also possible to determine the orientation in an overview image captured at an oblique angle. The orientation is then converted according to the homographic mapping so as to be comparable with an orientation of an image structure in the microscope image.

A computer program according to the invention comprises commands that cause the execution of one of the described method variants when said method variants are executed by a computer.

The learned models or machine learning models described in the present disclosure respectively denote a model learned by a learning algorithm using training data. The machine learning models can, for example, respectively comprise one or more convolutional neural networks (CNNs), which receive at least one input image—in particular an overview image, a microscope image or images calculated from the same—as input. The training of a machine learning model can have been carried out by means of a supervised learning process in which training overview images and/or training microscope images with an associated annotation/labelling were provided. A learning algorithm is used to define model parameters of the machine learning model based on the annotated training data. A predefined objective function can be optimized to this end, e.g. a loss function can be minimized. The loss function describes deviations between the predetermined labels and current outputs of the machine learning model, which are calculated with the current model parameter values from entered training data. The model parameter values are modified to minimize the loss function, said modifications being calculated, e.g., by gradient descent and backpropagation. In the case of a CNN, the model parameters can in particular include entries of convolution matrices of the different layers of the CNN. Other deep neural network model architectures are also possible instead of a CNN. Instead of a supervised learning process, it is also possible to carry out an unsupervised training in which an annotation of the training images does not occur. A partially supervised training or reinforcement learning is also possible. The localization of image structures, the evaluation of the image structures and/or the measurement of the image structures, in particular the determination of an orientation of the image structures, can occur by means of one or more models which perform a classification, regression, segmentation and/or detection.

The characteristics of the invention that have been described as additional apparatus features also yield, when implemented as intended, variants of the method according to the invention. Conversely, a microscopy system can also be configured to carry out the described method variants. In particular, the computing device can be configured to carry out the described method variants and/or output commands for the execution of described method steps. The computing device can also comprise the described computer program. While a ready-trained machine learning model is used with some variants, other variants of the invention result from the implementation of the corresponding training steps.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components:

FIG. 7 is a further schematic illustration of processes of an example embodiment of a method of the invention.

DETAILED DESCRIPTION OF EMBODIMENTS

Figure 2:
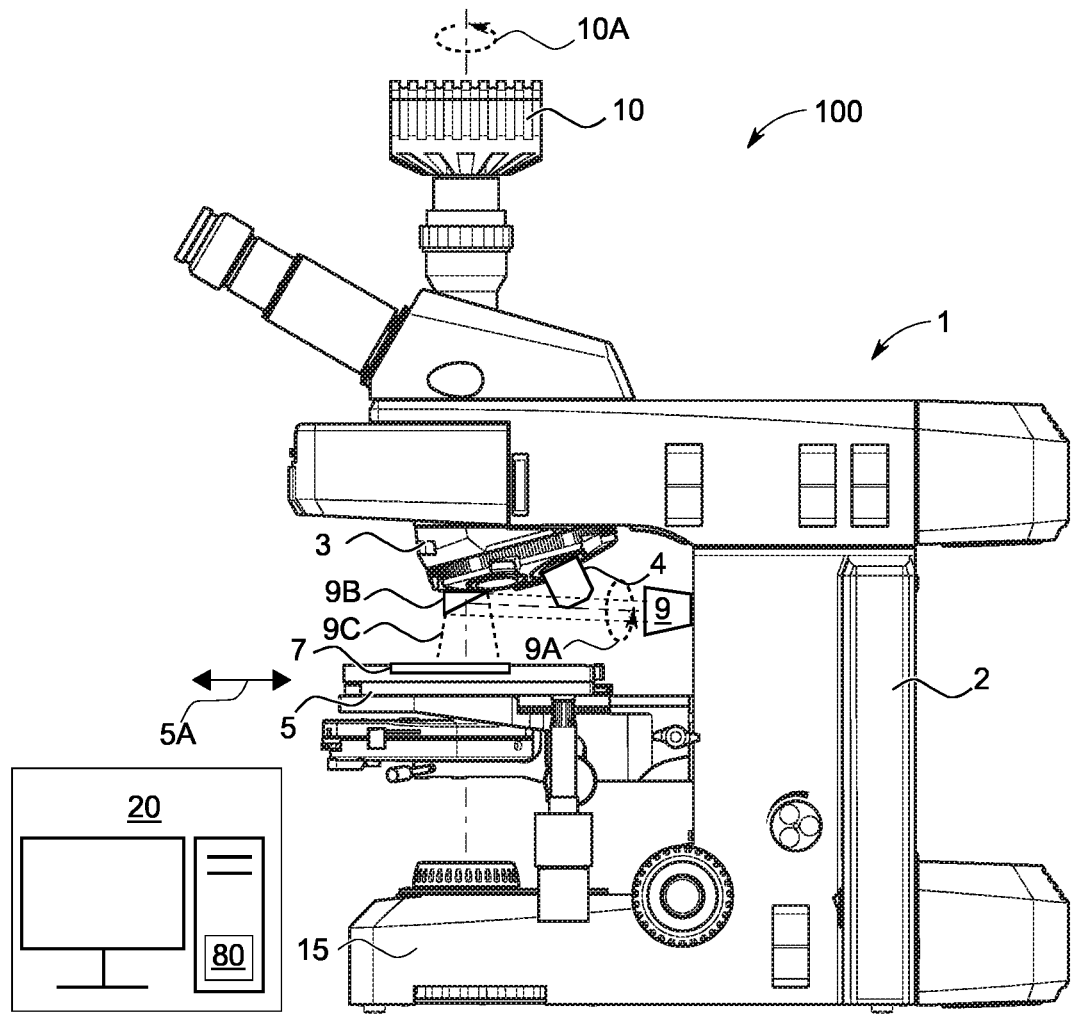
FIG. 2 is a schematic illustration of an example embodiment of a microscopy system of the invention.

Different example embodiments are described in the following with reference to the figures.
FIG. 2

FIG. 2 shows an example embodiment of a microscopy system 100 according to the invention. The microscopy system 100 comprises a computing device 20 and a microscope 1, which is a light microscope in the illustrated example, but which can essentially be any type of microscope. The microscope 1 comprises a stand 2 via which further microscope components are supported. The latter can in particular include: an illumination device 15, an objective changer/revolver 3, on which an objective 4 is mounted in the illustrated example; a sample stage 5, on which a sample carrier 7 can be positioned, and a microscope camera 10. When the objective 4 has been rotated so as to be located in the light path of the microscope, the microscope camera 10 receives detection light from the sample area in order to capture a microscope image.

The microscope 1 also comprises an overview camera 9 for capturing an overview image of the sample carrier 7 or of a sample environment. A field of view 9C of the overview camera 9 is larger than a field of view when a microscope image is captured. In the illustrated example, the overview camera 9 views the sample carrier 7 via a mirror 9B. The mirror 9B is arranged on the objective revolver 3 and can be selected instead of the objective 4. In variants of this embodiment, the mirror or some other deflection element can also be arranged at a different site. Alternatively, the overview camera 9 can also be arranged so as to view the sample carrier 7 directly without a mirror 9B. The overview camera 9 views a top side of the sample carrier 7 in the illustrated example, although it can alternatively be aimed at a bottom side of the sample carrier 7.

Figure 1:
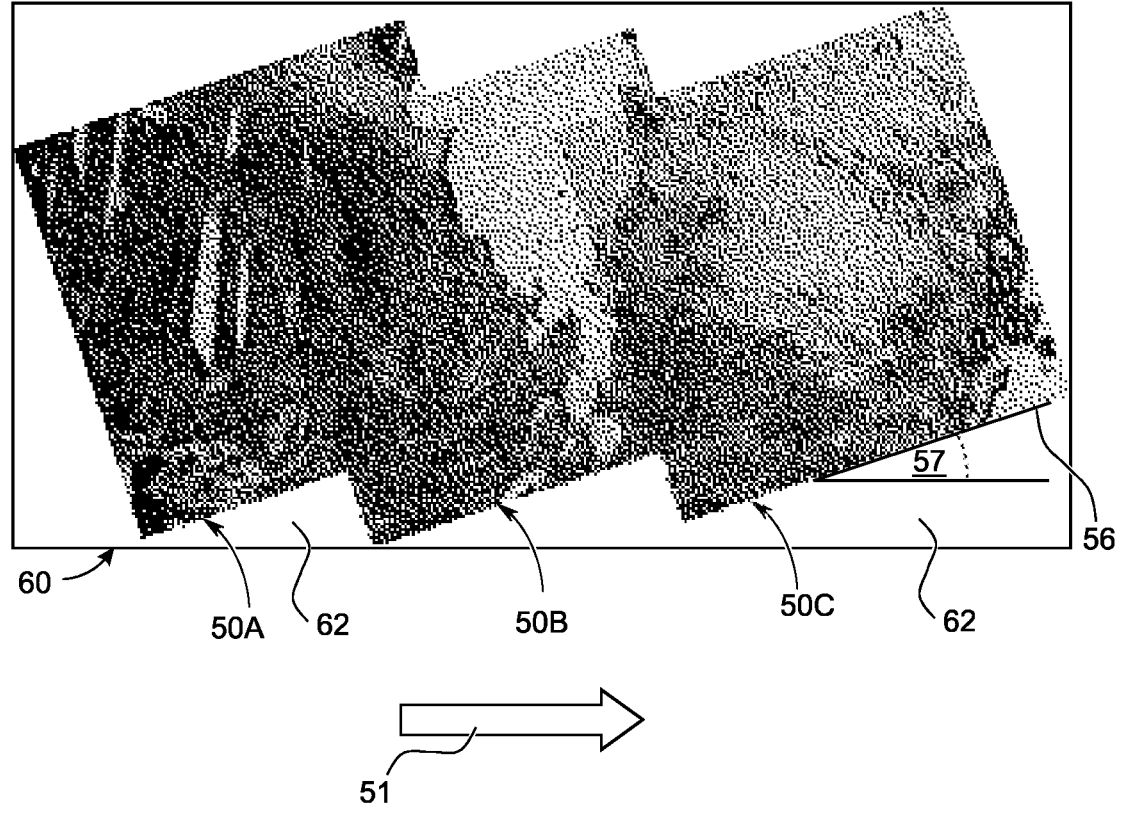
FIG. 1 schematically shows the assembly of a plurality of microscope images into an aggregate image.

The computing device 20 uses a computer program 80 according to the invention to process overview images and microscope images and optionally to control microscope components based on processing results. In particular, the computing device 20 can control the sample stage 5 to perform a movement 5A in a lateral direction (e.g. perpendicular to the optical axis along which light can be conducted to the microscope camera 10). This allows a plurality of laterally overlapping microscope images to be captured and combined into one aggregate image, as explained in relation to FIG. 1. A rotational orientation 10A of the microscope camera 10 relative to the sample stage 5 influences the orientation of the individual microscope images relative to the translational movement 5A. The microscope camera 10 can be mounted so as to be rotatable so that its exact rotational orientation 10A can be unknown. Different rotational orientations 10A or angles of rotation of the microscope camera 10 about the optical axis cause a rotation of the field of view of the microscope camera 10 in a plane on the sample stage 5. The rotational orientation 10A is determined by means of the invention. A known rotational orientation 9A of the overview camera 9 can be used in the process. The rotational orientation 9A analogously determines the rotation of the field of view 9C of the overview camera 9 in a plane on the sample stage 5. The overview camera 9 is rigidly mounted, e.g., on the stand 2 so that its rotational orientation 9A does not change and is known during normal operation. Generally known calibration techniques can be used to determine the rotational orientation 9A.

A basic sequence of processes of variants of the invention for determining the rotational orientation 10A is described in the following with reference to FIG. 3.

FIG. 3

Figure 3:
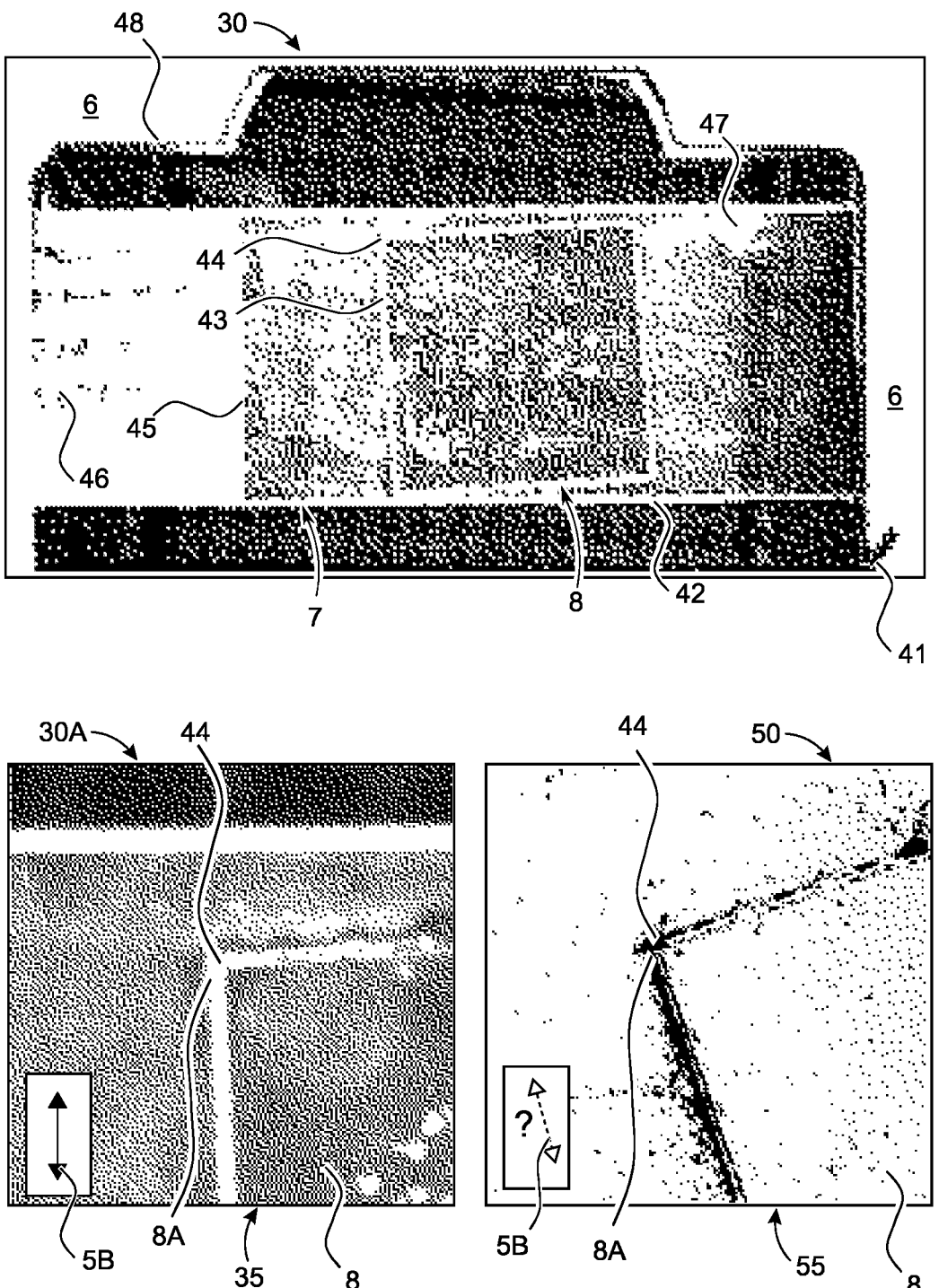
FIG. 3 schematically illustrates processes of an example embodiment of a method of the invention.

FIG. 3 schematically shows an overview image 30 captured by the overview camera. A sample carrier 7 held by a holding frame 6 on a sample stage is visible in the overview image 30. A cover slip 8 lies on the sample carrier 7. A sample can be accommodated between the cover slip 8 and the sample carrier 7.

An enlarged section 30A of the overview image 30 shows image structures 35 of the overview image 30 in the area of a corner 8A of the cover slip 8.

The rotational orientation of the overview camera relative to the sample stage is known so that an axis 5B of the sample stage in the overview image 30 or section 30A is known. The axis 5B can be an essentially arbitrarily defined direction in the plane of the sample stage and symbolizes here that, in the event of a translational movement of the sample stage, a direction of translation of the image content captured by the overview camera is known.

FIG. 3 shows—still schematically—a microscope image 50 captured by the microscope camera of FIG. 2. The microscope image 50 shows the same area of the sample carrier 7 as the section 30A of the overview image 30. Image structures 55 are consequently visible around the same corner 8A of the cover slip 8 in the microscope image 50. However, as the rotational orientation of the microscope camera is unknown or at least not known with precision, the direction of the axis 5B of the sample stage in the microscope image 50 is unknown. If the sample stage is moved, it is not possible to predict a direction of translation of the image content in microscope images 50. The invention redresses this problem by determining the direction of the axis 5B of the sample stage in the microscope image 50, i.e., the rotational orientation of the microscope camera with respect to the sample stage is determined.

This can occur by means of a comparison of the orientation of the image structures 35 of the overview image 30 (or section 30A) with the orientation of the image structures 55 of the microscope image 50. The orientation of the cover slip corner 8A can be readily determined both in the section 30A and in the microscope image 50. An angle between these two orientations indicates a relative rotation between the microscope camera and the overview camera. The axis 5B of the sample stage in the microscope image 50 can now be indicated by rotating the axis 5B in the section 30A of the overview image by this angle, i.e. according to the relative rotation. The rotational orientation of the microscope camera can thus be determined without time-consuming measurements and essentially fully automatically.

The assessment that makes use of the cover slip corner 8A is only described as a possible example in this connection. In principle, it is possible to use any detail 41-48 visible in the overview image 30. Details 41-48 can be located, e.g., on the sample carrier 7, on the holding frame 6 or on the sample stage 5. The detail 41 is a marking on the holding frame 6, the detail 42 is an edge of the sample holder 7, the detail 43 is an edge of the cover slip 8, the detail 44 is one of the corners of the cover slip 8, the detail 45 is an edge of a labelling field of the sample holder 7, the detail 46 is a text on the sample holder 7, the detail 47 is a fingerprint on the sample holder 7 and the detail 48 is an inner edge of the holding frame 6. In particular edges or corners can be suitable details, as their orientation in captured images can be determined relatively easily and with precision.

The following contains a more detailed description of variants of the invention with reference to the remaining figures.

Figure 4:
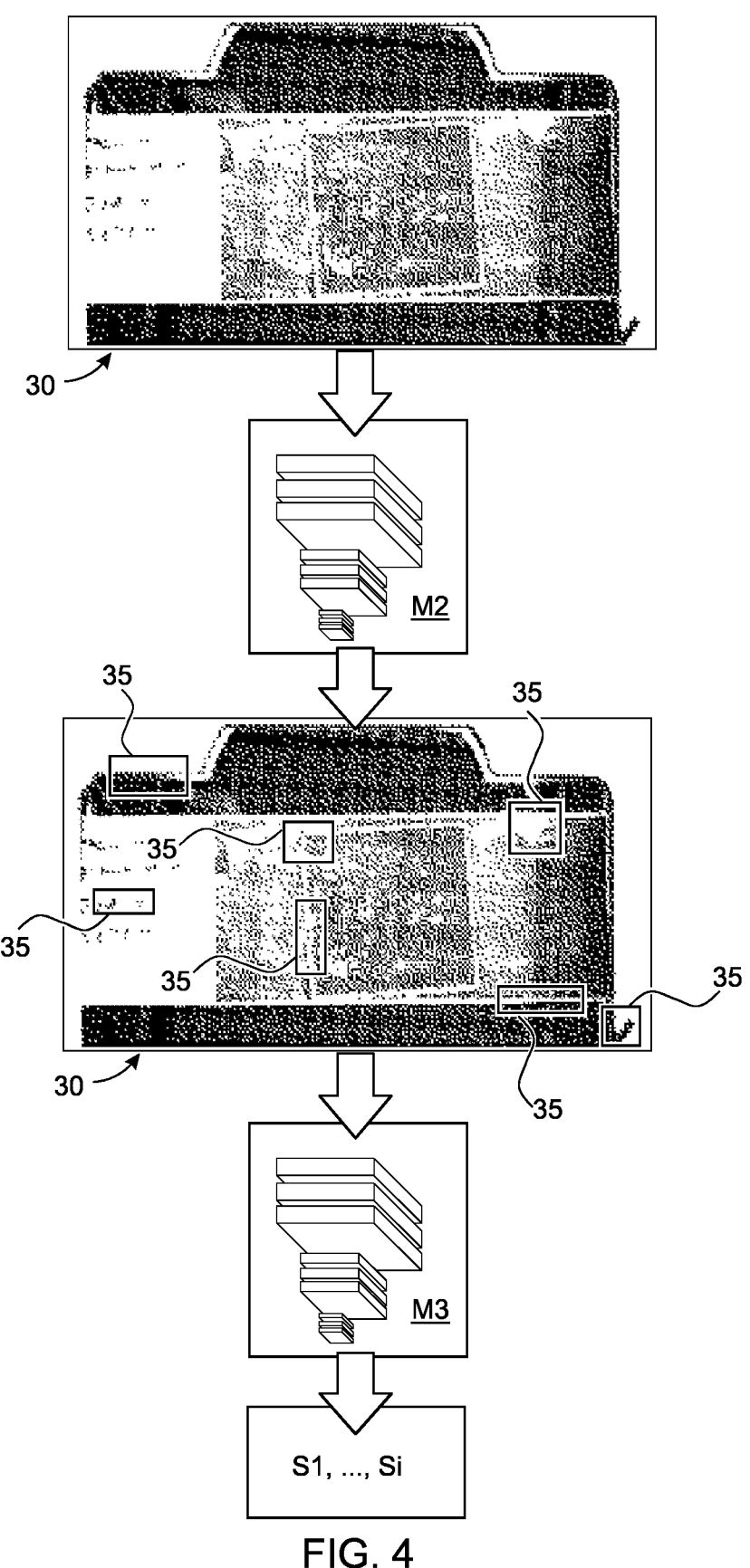
FIG. 4 schematically illustrates processes of an example embodiment of a method of the invention.

FIGS. 4 and 7

FIG. 4 shows processes of an example embodiment of a method according to the invention that is executable by the computer program 80 or computing device 20 of FIG. 2.

Processes of this method are shown as a flowchart in FIG. 7. The following description relates to both FIGS. 4 and 7. The sequence of processes described here and illustrated in the figures is not compulsory; rather, it is also possible for different processes to occur simultaneously or for the sequence to be partially modified.

In the example shown, an overview image 30 is first captured with the overview camera in process P1.

In process P2, image structures of one or more details in the overview image are now determined, which can optionally occur with a model M2 trained for this purpose. The model M2 can be trained with training images that correspond to annotated overview images. Image structures of details are labelled as annotations, for example by coordinates of bounding boxes, for each overview image of the training data. The annotations can be specified manually. This allows a model M2 to be learned which can output, for an input overview image 30, the image coordinates of different image structures 35 corresponding to the details of the training data. FIG. 4 shows a superimposition of the overview image 30 and the image structures 35 localized by the model M2. The latter correspond to the details 41-48 described in relation to FIG. 3.

In process P3, the image structures 35 determined by the model M2 are evaluated. This can occur by means of a model M3 trained for the purpose or a classic algorithm without the use of a machine learning model. An awarded evaluation for an image structure 35 can correspond, for example, to the quality of an image contrast of this image structure. Straight edges can also be evaluated as better than round details. A distance of the detail in question from a current field of view of the microscope camera can also be considered in the evaluation. The greater this distance, the longer it will take for the sample stage to position the detail. A poorer evaluation is thus determined with increasing distance. These criteria can be applied during the learning of the model M3, for example by means of corresponding evaluation annotations for input images which correspond to the image structures 35. In order to take this distance into account, the model M3 can receive as input, in addition to one of the image structures 35, associated locational information, e.g., the image coordinates of the image structure 35 in question in the overview image 30. The model M3 now calculates an evaluation S1 to Si for each of the localized image structures 35. It is now possible to select either the detail of the image structure with the best evaluation or a plurality of details corresponding to the image structures with the best evaluations for use in the further actions for determining the rotation.

Figure 5:
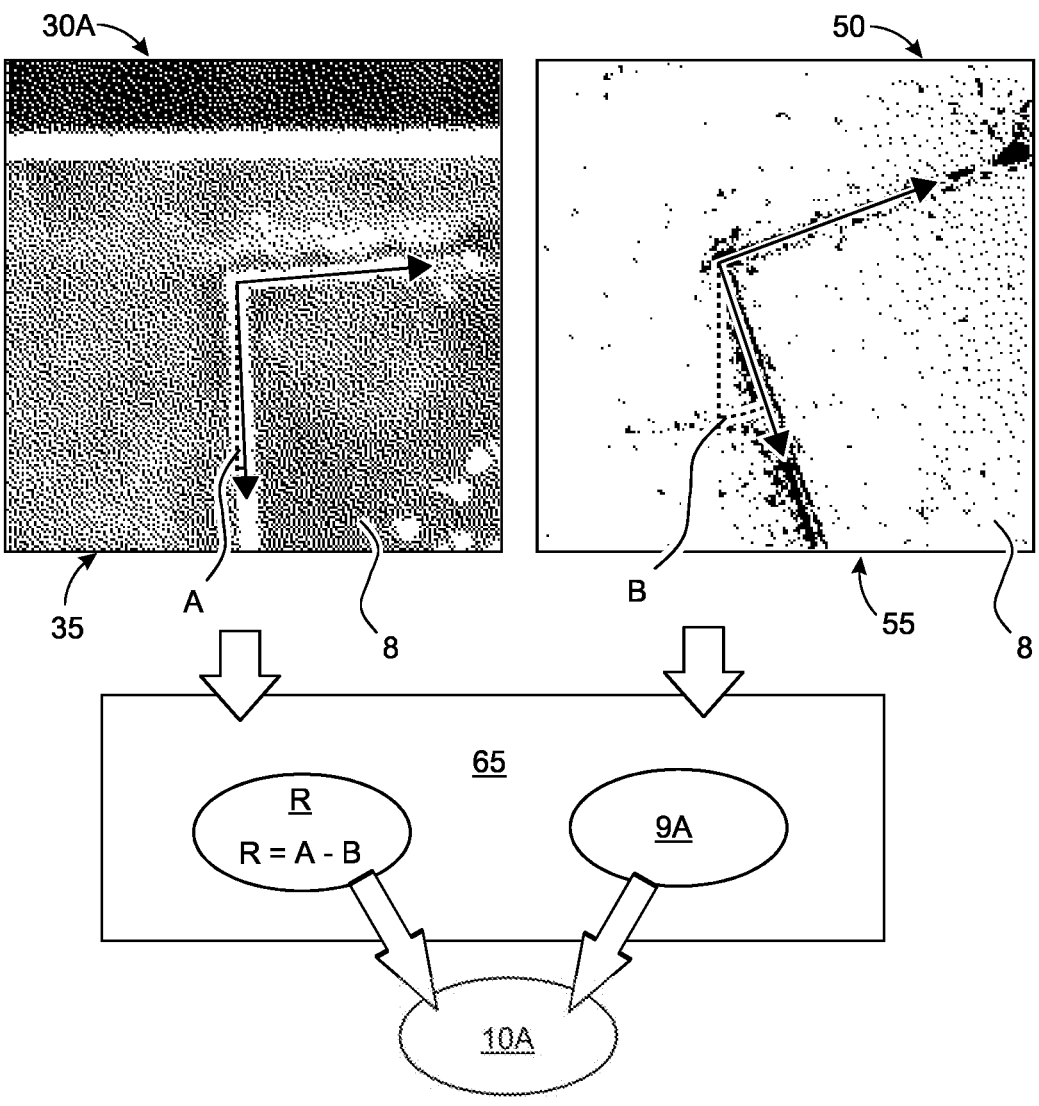
FIG. 5 schematically shows a continuation of the processes illustrated in FIG. 4.

The description of the further processes of the method is continued with reference to FIGS. 5 and 7.

FIGS. 5 and 7

FIG. 5 shows a section 30A of the overview image 30 for the image structure 35 that was evaluated as the best as described in the foregoing. In the example shown, the image structure 35 is a corner of the cover slip 8, i.e. the detail 44.

In process P4, the detail 44 is now positioned with the sample stage so that a microscope image 50 of the detail 44 can be captured.

In process P5, an orientation of the image structures 35 of the detail 44 in the overview image 30 or in the section 30A of the overview image 30 is determined. In the example shown, the orientation is indicated as the angle A between one of the cover slip edges at the corner of the cover slip 8 relative to a reference direction. The reference direction can run, for example, parallel to an image edge, e.g. the left image edge, of the overview image. The angle A is about 4° in the illustrated example. Analogously, the orientation of the image structure 55 in the microscope image 50 is determined as the angle B of one of the cover slip edges relative to a reference direction. The reference direction here likewise corresponds to the same (left) image edge. The angle B in the example shown is approximately 24°.

In process P6, the determined orientations of the image structures 35 and 55, i.e. the two angles A and B, are entered into a comparison algorithm 65. The comparison algorithm 65 calculates the difference of the angles A and B, in the example 20°, which indicates the relative rotation R between the microscope camera and the overview camera. The rotational orientation 10A of the microscope camera is calculated by the comparison algorithm 65 by taking into account the known rotational orientation 9A of the overview camera and the determined relative rotation R, i.e. the difference of 20° in this case.

This allows the orientation of the microscope camera 10 to be determined in a reliable and time-efficient manner. The known orientation can be used in various manners. For example, instructions to rotate the microscope camera 10 can be issued to a user. This allows the microscope camera 10 to be oriented in such a manner that, when a plurality of laterally overlapping microscope images are captured with the intention of stitching them together into a panoramic image similar to the image shown in FIG. 1, no blank spaces are produced in the panoramic image. To this end, the microscope camera 10 can be rotated, e.g., so that an image edge of subsequently captured microscope images runs parallel to a translational direction of the sample stage 5.

Figure 6:
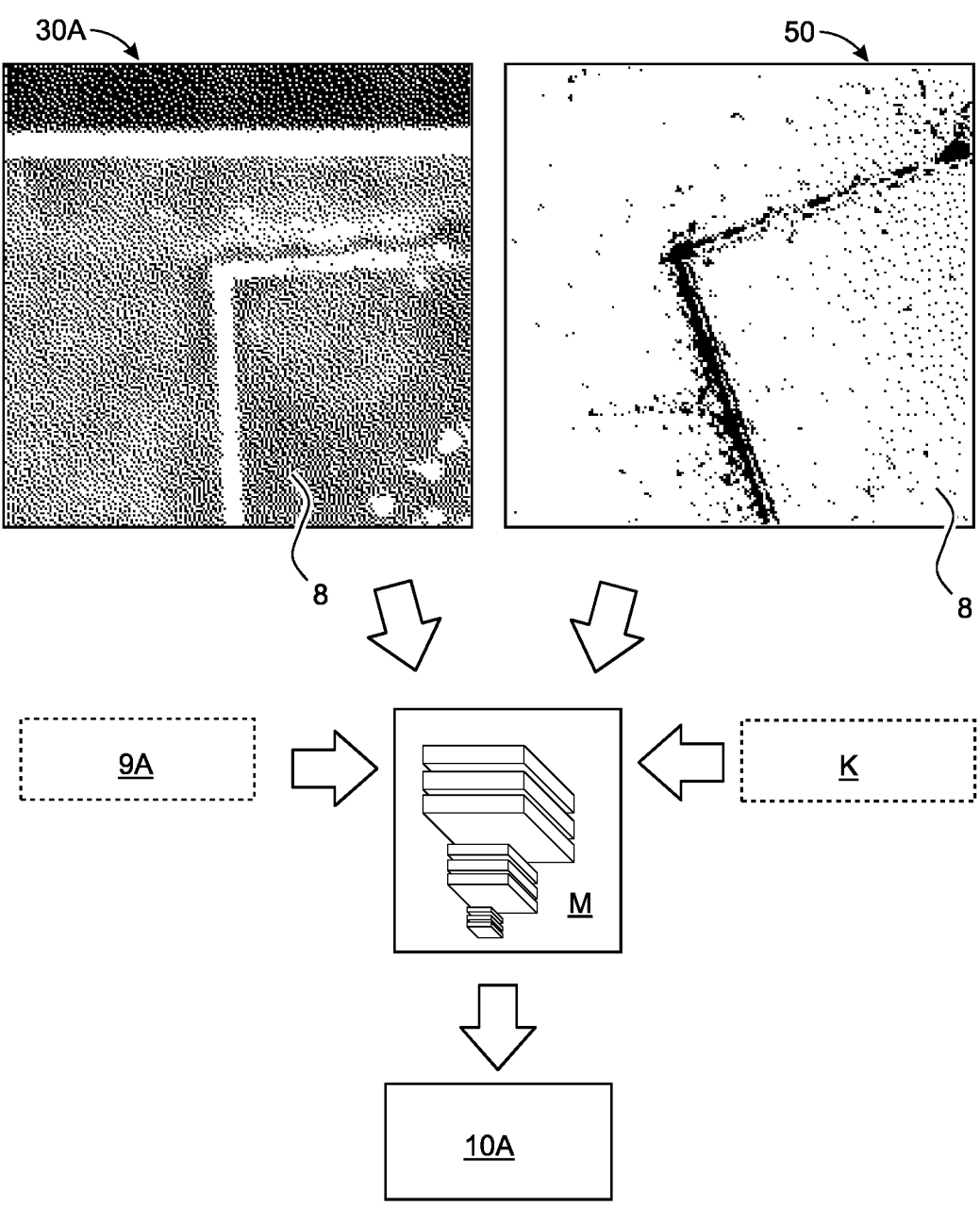
FIG. 6 schematically shows an alternative continuation of the processes illustrated in FIG. 4.

A variation of the described variant of the invention is described in the following with reference to FIG. 6.
FIG. 6

FIG. 6 shows processes of variants of the invention which can be performed alternatively to processes of FIG. 5.

As shown in FIG. 6, a microscope image 50 of a selected detail—of the corner of the cover slip in this example—has been captured.

This microscope image 50 and the corresponding section 30A of the overview image showing the same detail (i.e. the same cover slip corner) are now input conjointly into a learned machine learning model M. Optionally, an indication of the known rotational orientation 9A of the overview camera 9 is also fed to the machine learning model M. The machine learning model M calculates the rotational orientation 10A of the microscope camera 10 relative to the sample stage 5 directly from the input data.

To this end, the machine learning model M can have been learned using training data, the input data comprising a pair consisting of a microscope image of a detail and a section of an overview image of the same detail, as well as optionally an associated rotational orientation of the overview camera.

The respective rotational orientations of the microscope camera are specified in the form of annotations or target results.

Alternatively, it is also possible to use training data without any indication of the rotational orientation of the overview camera. Instead, for example, the relative rotation between an input image pair consisting of a microscope image and a corresponding section of the overview image can be respectively specified in the form of annotations. A model is thereby learned that determines the relative rotation between a microscope image and an overview image or a section of the latter.

As shown in FIG. 6, it is optionally also possible for contextual information K to be taken into account by the machine learning model M. The contextual information K can indicate, e.g., a type of the detail shown in the microscope image 50 and/or a type of sample carrier being used.

Further variations of the illustrated embodiments are possible. In particular, the implementation of additional image processing steps is possible. For example, the described assessment of a microscope image can occur after its conversion into a segmentation mask. In the example shown in FIG. 6, for example, the microscope image 50 shown could be replaced by a segmentation mask or binary mask in which the area of the cover slip 8 has one pixel value and the remaining image area has another pixel value. Correspondingly, the overview image 30 or the section 30A can first be segmented before the described processes for determining a rotation occur.

In a further variant, the model M2 shown in FIG. 4, which is a detection model, can be replaced. Instead, for example, one or more segmentation masks can be calculated from the overview image 30, wherein a type of the described details 41-48 is delimited from other image content in each segmentation mask. The shapes of the segmentation mask(s) can subsequently be analyzed in order to select one or more image areas for which a microscope image is to be respectively captured.

A further variant results when the models M2 and M3 of FIG. 4 are replaced by a single model that outputs one or more image structures with a corresponding evaluation directly from an input overview image 30. In principle, it is also possible for the evaluation to be omitted and to directly determine one or more image structures for which a respective microscope image is to be captured. It is thus possible for the model M3 and the process P3 to be omitted.

For the purpose of illustrating the invention, FIGS. 5 and 6 show an assessment of only one microscope image 50 and an associated section 30A of the overview image 30. However, it is also possible for further microscope images 50 of other details and corresponding sections of the overview image to be taken into account in order to determine the rotational orientation 10A from the same.

It is also possible for a plurality of microscope images 50 to be captured for a same detail and for said plurality of microscope images 50 to be taken into account in the determination of the rotational orientation 10A. The plurality of microscope images 50 can be captured, for example, during the positioning of the detail, or at different sample stage positions at which the detail is respectively located in the field of view of the microscope camera. It is also possible to take into account an indication of the respective sample stage positions here so that the resulting translation of the detail between the microscope images can also be taken into account.

By selecting elements on the sample carrier, holding frame or sample stage as details, a reliable assessment can occur even with samples that exhibit little contrast in the overview image. In variations of the described variant embodiments, it is also possible to assess the orientation of a detail in a microscope image different from the detail analyzed in the overview image. This is possible when the orientation of the different details to each other is known. For example, the orientation of the different edges of a cover slip or different edges of a sample carrier in relation to one another is known.

The described example embodiments are purely illustrative and variants of the same are possible within the scope of the attached claims.

LIST OF REFERENCE SIGNS

1 Microscope
2 Stand
3 Objective revolver
4 Microscope objective
5 Sample stage
5A Translational movement of the sample stage
5B Axis of the sample stage
6 Support frame
7 Sample carrier
8 Cover slip
8A Corner of the cover slip
9 Overview camera
9A Rotational orientation of the overview camera
9B Mirror
9C Field of view of the overview camera
10 Microscope camera
10A Rotational orientation of the microscope camera
15 Illumination device
20 Computing device
30 Overview image
30A Section of the overview image
41-48 Details on the sample carrier, holding frame or sample stage
50 Microscope image
50A-50C Microscope images
51 Translational direction of the sample stage
55 Image structures in the microscope image
56 Image edge of a microscope image
57 Angle between the image edge of a microscope image and the translational direction 51
60 Aggregate image created from a plurality of microscope images
62 Blank image areas of the aggregate image
65 Comparison algorithm
80 Computer program of the invention
100 Microscopy system of the invention
A Angle/orientation of an image structure 35 of the overview image 30
B Angle/orientation of an image structure 55 of the microscope image 50
K Contextual information
M, M2, M3 Machine learning models
P1-P6 Method processes of example embodiments of the invention
R Relative rotation between the microscope image 50 and the overview image 30
S1-Si Evaluations of the image structures of different details

What is claimed is:

1. A method for checking a rotation of a microscope camera, comprising
capturing an overview image with an overview camera of a microscope;
determining at least one image structure in the overview image suitable for use as an orientation determination feature in order to determine a rotational orientation of a microscope camera relative to a sample stage;
moving the sample stage to bring the determined orientation determination feature closer to a center of a field of view of the microscope camera compared with a sample stage position used for capturing the overview image, and capturing a microscope image of the orientation determination feature with the microscope camera which is distinct from the overview camera;
calculating a relative rotation between the microscope camera and the overview camera as a rotation between the orientation determination feature in the microscope image and the overview image; and
calculating the rotational orientation of the microscope camera relative to the sample stage from a known rotational orientation of the overview camera relative to the sample stage and based on the calculated relative rotation between the microscope camera and the overview camera.

2. A computer program stored on a non-transitory computer readable medium with commands that, when executed by a computer, cause the execution of the method according to claim 1.

3. A microscopy system, comprising
a microscope with a microscope camera and with an overview camera, wherein the microscope camera and the overview camera are two distinct cameras, wherein a rotational orientation of the overview camera relative to a sample stage of the microscope is known; and
a computing device configured to:
determine at least one image structure in an overview image captured with the overview camera suitable for use as an orientation determination feature in order to determine a rotational orientation of the microscope camera relative to the sample stage;
instruct movement of the sample stage to bring the determined orientation determination feature closer to a center of a field of view of the microscope camera compared with a sample stage position used for capturing the overview image, and instruct capturing a microscope image of the orientation determination feature with the microscope camera;
calculate a relative rotation between the microscope camera and the overview camera as a rotation between the orientation determination feature in the microscope image and the overview image; and
calculate a rotational orientation of the microscope camera relative to the sample stage from the known rotational orientation of the overview camera relative to the sample stage and based on the calculated relative rotation between the microscope camera and the overview camera.

4. The microscopy system according to claim 3, wherein the computing device is configured to perform or command the following:
localizing image structures in the overview image to determine the orientation determination feature.

5. The microscopy system according to claim 3, wherein the at least one image structure represents at least one detail of a sample carrier, of a holding frame for a sample carrier, of the sample stage or of an object present on the sample carrier.

6. The microscopy system according to claim 3, wherein the computing device is configured to localize at least two of the following details in the overview image:

a cover slip corner or edge, a sample carrier corner or edge, a labelling field corner or edge, a holding frame corner or edge, a marking on a holding frame or on a sample carrier, and text or a contamination on the sample carrier;

wherein the computing device is configured to select, by evaluating image structures of these details in the overview image, which of these details is to be used as the orientation determination feature.

7. The microscopy system according to claim 6, wherein evaluating the image structures of details in the overview image is carried out based on one or more of the following criteria:

based on geometric shapes of the image structures, based on a type of a determined detail, wherein an evaluation relating to a visibility of different types of details in microscope images is stored for said types, based on a possibility of a safe movement to and focusing of the details, with regard to collision prevention, based on a period of time required to capture microscope images of the details or based on a length of a translation path of the sample stage in order to move to the details.

8. The microscopy system according to claim 3, wherein, in cases where a plurality of image structures are selected for use as the orientation determination feature, the computing device is configured to make said selection as a function of translation paths of the sample stage between these image structures.

9. The microscopy system according to claim 3, wherein the computing device is configured to determine the relative rotation between the microscope image and the overview image by:

determining an orientation of the orientation determination feature in the overview image;

determining an orientation of the orientation determination feature in the microscope image;

comparing the orientations of the orientation determination feature in the overview image and in the microscope image.

10. The microscopy system according to claim 3, wherein the computing device is configured to take into account a known rough orientation of the microscope camera when calculating the rotational orientation of the microscope camera.

11. The microscopy system according to claim 3, wherein the computing device is configured to feed input data to a machine learning model, the input data comprising at least the overview image and the microscope image or a respective section of the same; and wherein the machine learning model is trained, using training data that resembles the input data, to calculate a relative rotation between an input overview image and an input microscope image or sections of the same or to calculate a rotational orientation of the microscope camera.

12. The microscopy system according to claim 11, wherein the input data of the machine learning model additionally comprises the known rotational orientation of the overview camera.

13. The microscopy system according to claim 3, wherein the computing device is configured to take contextual information into account in the calculation of the rotational orientation of the microscope camera, wherein the contextual information relates to one or more of the following:

a type of holding frame used, wherein the type of the holding frame used is determined from the overview image or a further overview image by image analysis;

a type of sample carrier used, wherein the type of sample carrier used is determined from the overview image or a further overview image by image analysis;

a preselection by a user of a type of detail to be assessed; and a quality of a previous calculation of the rotational orientation of the microscope camera.

14. The microscopy system according to claim 3, wherein a plurality of microscope images are captured during movement of the sample stage, and wherein the plurality of microscope images and indications relating to the movement of the sample stage are taken into account in the calculation of the rotational orientation of the microscope camera.

15. The microscopy system according to claim 3, wherein the computing device is configured, in cases where the calculation of the rotational orientation from a single microscope image would be imprecise or is not possible:

to capture a plurality of microscope images of the orientation determination feature at different sample stage positions, and to calculate the rotational orientation of the microscope camera based on a translation of image structures of the orientation determination feature in the plurality of microscope images and taking into account the different sample stage positions.

16. The microscopy system according to claim 3, wherein the computing device is configured for:

communicating the determined rotational orientation of the microscope camera to an image stitching algorithm, wherein the image stitching algorithm is designed to stitch a plurality of microscope images captured at different sample stage positions together into an aggregate image and to take into account the determined rotational orientation of the microscope camera during said stitching.

17. The microscopy system according to claim 3, wherein the computing device is configured to output an instruction for rotating the microscope camera to a microscope user, based on the determined rotational orientation of the microscope camera.

18. The microscopy system according to claim 3, wherein the computing device is configured to set a translational direction of the sample stage as a function of the calculated rotational orientation of the microscope camera so that the translational direction runs parallel to an image edge of the microscope image.

19. The microscopy system according to claim 3, wherein the computing device is configured to capture in succession a plurality of microscope images at different sample stage positions and assemble them into an aggregate image, wherein the sample stage positions are determined as a function of the calculated rotational orientation of the microscope camera so that the aggregate image displays a predetermined sample area without any gaps and the aggregate image does not have any blank areas at its edges.

20. The microscopy system according to claim 3, wherein the orientation determination feature comprises a detail of a structure associated with the sample stage, distinct from a sample located on the sample stage.

\* \* \* \* \*